(12) United States Patent
Broersma et al.

(10) Patent No.: US 12,270,379 B2
(45) Date of Patent: Apr. 8, 2025

(54) LOAD MITIGATION ARRANGEMENT

(71) Applicant: Siemens Gamesa Renewable Energy A/S, Brande (DK)

(72) Inventors: Liekele Broersma, Vejle (DK); Peder Bay Enevoldsen, Vejle (DK); Alejandro Gomez Gonzalez, Aarhus (DK); Erik Steven Haugen, Herning (DK); Bjarne Skovmose Kallesøe, Bagsværd (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/254,391

(22) PCT Filed: Nov. 12, 2021

(86) PCT No.: PCT/EP2021/081506
§ 371 (c)(1),
(2) Date: May 25, 2023

(87) PCT Pub. No.: WO2022/117314
PCT Pub. Date: Jun. 9, 2022

(65) Prior Publication Data
US 2024/0035442 A1 Feb. 1, 2024

(30) Foreign Application Priority Data
Dec. 3, 2020 (EP) .................................. 20211453

(51) Int. Cl.
*F03D 7/02* (2006.01)
*F03D 13/40* (2016.01)
(Continued)

(52) U.S. Cl.
CPC ......... *F03D 7/0232* (2013.01); *F03D 13/401* (2023.08); *F03D 17/011* (2023.08);
(Continued)

(58) Field of Classification Search
CPC .. F03D 7/0232; F03D 1/06495; F03D 1/0685; F03D 13/10; F03D 13/40;
(Continued)

(56) References Cited

U.S. PATENT DOCUMENTS

| | | | |
|---|---|---|---|
| 7,878,459 B2 * | 2/2011 | Mabe | B64C 27/615 244/214 |
| 2011/0135466 A1 * | 6/2011 | Latorre | F03D 17/00 416/61 |

(Continued)

FOREIGN PATENT DOCUMENTS

| | | |
|---|---|---|
| EP | 2708734 B1 | 11/2016 |
| EP | 2669238 B1 | 12/2016 |

(Continued)

OTHER PUBLICATIONS

PCT International Search Report and Written Opinion of International Searching Authority mailed Jan. 21, 2022 corresponding to PCT International Application No. PCT/EP2021/081506 filed Nov. 12, 2021.

(Continued)

*Primary Examiner* — Christopher Verdier
*Assistant Examiner* — Arthur Paul Golik
(74) *Attorney, Agent, or Firm* — Schmeiser, Olsen & Watts LLP (57) ABSTRACT

A load mitigation arrangement of a non-mounted rotor blade, includes at least one actuatable lift-modification device arranged on a surface of the rotor blade; a monitor configured to estimate the magnitudes of loads acting on the non-mounted rotor blade; a controller configured to actuate the lift-modification device on the basis of the estimated magnitudes to mitigate the loads acting on the non-mounted (Continued)

rotor blade. Further provided is a rotor blade assembly, and a method of performing load mitigation on a non-mounted rotor blade.

8 Claims, 6 Drawing Sheets (51) Int. Cl.
*F03D 17/00* (2016.01)
*F03D 1/06* (2006.01)
*F03D 13/10* (2016.01)

(52) U.S. Cl.
CPC ........ *F03D 17/028* (2023.08); *F03D 1/06495* (2023.08); *F03D 1/0685* (2023.08); *F03D 13/10* (2016.05); *F03D 13/108* (2023.08); *F05B 2230/604* (2013.01); *F05B 2240/3052* (2020.08); *F05B 2260/02* (2013.01); *F05B 2260/83* (2013.01); *F05B 2270/17* (2013.01); *F05B 2270/309* (2013.01); *F05B 2270/32* (2013.01); *F05B 2270/321* (2013.01); *F05B 2270/327* (2013.01); *F05B 2270/331* (2013.01); *F05B 2270/332* (2013.01)

(58) Field of Classification Search
CPC .... F03D 13/108; F03D 13/401; F03D 17/011; F03D 17/028; F03D 17/0285; F03D 17/00; F03D 7/0252; F05B 2230/604; F05B 2260/80; F05B 2270/331; F05B 2270/332; F05B 2270/17; F05B 2270/33; F05B 2270/333; F05B 2270/334; F05B 2240/305; F05B 2240/3052; F05B 2260/02; F05B 2270/309; F05B 2270/32; F05B 2270/321

See application file for complete search history.

(56) References Cited

U.S. PATENT DOCUMENTS

| | | | | |
|---|---|---|---|---|
| 2011/0142676 | A1* | 6/2011 | Mohammed | F03D 1/0633 416/241 R |
| 2011/0206507 | A1* | 8/2011 | Bhaisora | F03D 1/0675 416/1 |
| 2011/0223033 | A1* | 9/2011 | Wang | F03D 1/0675 416/235 |
| 2012/0141271 | A1 | 6/2012 | Southwick | |
| 2017/0233228 | A1* | 8/2017 | Coners | B66C 23/185 29/889.21 |
| 2019/0113536 | A1* | 4/2019 | Holtom | B66C 15/06 |

FOREIGN PATENT DOCUMENTS

| | | | | |
|---|---|---|---|---|
| EP | 3225834 | B1 | 11/2019 | |
| EP | 3885572 | A1 | 9/2021 | |
| NL | 1035525 | C1 * | 7/2009 | |
| WO | WO-2011105887 | A1 * | 9/2011 | ........... F03D 1/0633 |

OTHER PUBLICATIONS

Kuijken L.; "Single Blade Installation for Large Wind Turbines in Extreme Wind Conditions A Quasi-Steady Aeroelastic Study in High Wind Speeds under Different Inflow Angles"; European Wind Energy Master; Feb. 2015.

* cited by examiner

LOAD MITIGATION ARRANGEMENT

CROSS-REFERENCE TO RELATED APPLICATIONS

This application claims priority to PCT Application No. PCT/EP2021/081506, having a filing date of Nov. 12, 2021, which claims priority to EP Application No. 20211453.4, having a filing date of Dec. 3, 2020, the entire contents both of which are hereby incorporated by reference.

FIELD OF TECHNOLOGY

The following relates to a load mitigation arrangement of a non-mounted rotor blade; a rotor blade assembly; and a method of performing load mitigation on a non-mounted rotor blade.

BACKGROUND

Wind turbine rotor blades are primarily designed to maximize the amount of energy that can be captured from the wind. An aerodynamic rotor with well-designed rotor blades will operate optimally at a very broad range of wind speeds, from very low wind speeds (by adjusting the rotor speed) to very high wind speeds (by adjusting the pitch angle). Good aerodynamic performance is generally achieved by designing the rotor blade airfoil to maximize the power extraction coefficient, which is related to the aerodynamic lift level of the airfoils chosen as well as to the planform (i.e., the shape) of the blade. However, the favorable airfoil design of a rotor blade can lead to problems during transport and installation when the rotor blade is exposed to wind, particularly in the case of a long rotor blade with large maximum chord. For example, the high lift and/or drag forces acting on rotor blades arranged in a storage rack on the deck of a transport vessel can place great strain on the storage rack structure, and the vulnerable surface of a rotor blade may sustain damage from being thrust against the rigid framework of a storage rack. Another example is the level of loading on a blade while being transported by land (e.g., by truck or by train), where lateral forces can be quite large due to gusts and turbulence. Another example is the level of loading on a crane during blade lifting operations. A further example is the high loading on blades and their support structures when stored in open-air facilities such as yards or ports. To avoid such problems during storage and transport of a long rotor blade, it is known to construct any holding apparatus to withstand the large forces. For example, lift forces are calculated for various possible orientations of the rotor blade and this information is used to determine the dimensions of storage clamps, supports, etc. However, the required large dimensions contribute significantly to the overall cost of the necessary infrastructure for storage, handling, and installation of wind turbine rotor blades.

The high lift forces may be even more problematic during the installation procedure of a long rotor blade that is raised horizontally to the hub of a wind turbine. The hazardous and complex installation procedure is made even more difficult when lift forces cause the rotor blade to deflect as it is suspended from a hoisting apparatus such as a crane. To avoid such problems, it may be necessary to postpone or interrupt an installation procedure until favorable wind conditions prevail. Another measure is to construct the lifting brackets, lifting yokes, crane assemblies etc., to withstand the large forces. These additional design measures also contribute significantly to the overall costs.

To reduce the lift forces arising during storage, transport or lifting, a rotor blade can be partially or entirely enclosed in a rigid or inflatable envelope in order to "hide" its airfoil from the incoming airflow. However, the additional cost of such an envelope is considerable, particularly in the case of long rotor blades that need to be transported to offshore installation sites.

Another approach is to orient the rotor blade so that its airfoil chord plane (the plane between leading edge and trailing edge) is essentially vertical. This orientation reduces the lift forces acting on the rotor blade airfoil. However, a drawback of this blade orientation is that turbulence and vortices developing at the downwind face of the rotor blade can make the installation process very difficult. In this position, the rotor blade is subjected to the maximum drag forces due to the high projected area of the blade.

When considering how to safely store, transport and install long wind turbine rotor blades, engineers must therefore choose between two extreme situations: a substantially vertical chord plane with relatively constant but unfavorably high drag loading; or a horizontal chord plane with lower overall loading but unfavorably high lift load variation.

SUMMARY

An aspect relates to provide an improved way of storing, transporting and installing wind turbine rotor blades.

According to embodiments of the invention, the load mitigation arrangement for a non-mounted rotor blade comprises at least one actuatable lift-modification device—commonly referred to as a spoiler—arranged on the rotor blade. The load mitigation arrangement also comprises a monitoring means or monitor configured to estimate the magnitudes of loads acting on the non-mounted rotor blade, and a control arrangement configured to actuate the lift-modification device on the basis of the estimated load magnitudes in order to mitigate or reduce the wind load on the non-mounted rotor blade.

The term "non-mounted" is to be understood to mean that the rotor blade has not yet been mounted to the hub of a wind turbine, i.e., the rotor blade has not yet been installed. The terms "non-mounted", "non-installed" and "not yet installed" are regarded as equivalent expressions and may be used interchangeably in the following.

It is known to use spoilers on wind turbine rotor blades, but their purpose is generally to improve the lift-to-drag ratio in the inboard end. This is because the cylindrical root end and the relatively thick transition region of a typical rotor blade are characterized by high drag and low lift during normal operation of the wind turbine, behavior which is also related to the inherent low airflow velocity at the inboard end during wind turbine operation. For these reasons, a spoiler may be mounted at the trailing edge of the transition region in order to increase the lift-to-drag ratio during normal operation of the wind turbine. On account of their location and size, such spoilers cannot assist in reducing loads on the rotor blade during storage, transport and installation.

In contrast, the inventive load mitigation arrangement deploys one or more spoilers to mitigate or reduce loads on the non-mounted rotor blade, which can be exposed to a very different airflow pattern. The spoiler or lift-modification device will have the effect of reducing lift/drag forces on the rotor blade as it is exposed to an airflow in its non-mounted state. This has the effect of reducing the forces acting on any blade handling apparatus, for example lifting equipment during a hoisting maneuver or support racks of a storage assembly. By reducing the loads acting on the rotor blade during a hoisting maneuver, the spoiler makes a significant contribution to a favorably stable rotor blade position during an installation procedure, even if the wind conditions would otherwise—in a conventional art approach—require interruption of the procedure or a re-positioning of the hoisting apparatus as explained above. During storage, transport, or installation of the rotor blades, the spoilers can be suitably placed such that they reduce lift/drag forces over the most relevant regions of the rotor blade. These may be regions with relatively large chord length and/or regions with relatively low thickness-to-chord ratio. A large spoiler can be used in different chordwise positions on both the suction and/or the pressure side of the blade depending on the orientation of the rotor blade during storage, handling and installation stages.

Because the spoiler(s) of the inventive load mitigation arrangement reduce the lift/drag forces acting on the rotor blade, this effectively widens the "weather window" during which it is safe to hoist and install blades. With the inventive load mitigation arrangement, a contractor may be able to carry out transport and/or installation procedures in "unfavorable" wind conditions, i.e. wind conditions that would otherwise require the contractor to wait for the wind to reduce in magnitude and/or to return to a favorable direction, or which would otherwise require the contractor to reposition an installation vessel.

The reduction in force acting on the rotor blade, as achieved by the spoiler(s) of the inventive load mitigation arrangement, is also very beneficial during transport and storage of long rotor blades. Because the spoilers reduce the lift/drag forces, any storage racks, brackets, frames etc., can be constructed more economically. During transportation—for example when the rotor blades of an offshore wind farm are stacked in racks on the deck of a transport vessel—the favorable load mitigation can avoid a time-consuming re-positioning of the vessel that would otherwise be necessary in order to avoid damage to the rotor blades and/or to the storage racks.

The inventive load mitigation arrangement can also ensure a more stable loading of the rotor blades, since—for example—it reduces the level of variation of lift as a function of the angle of incoming wind, and it creates a more stable wake behind the blade, and the associated aerodynamic loading is reduced accordingly.

The rotor blade assembly comprises a rotor blade which is not yet mounted to the hub of a partially assembled wind turbine, and which has been prepared to comprise at least one actuatable lift-modification device arranged on its surface, and an interface to a controller of an embodiment of the inventive load mitigation arrangement.

According to embodiments of the invention, the method of performing load mitigation on such a rotor blade assembly comprises the steps of arranging at least one actuatable lift-modification device on the non-mounted rotor blade; estimating loads acting on the rotor blade; and actuating a lift-modification device on the basis of the estimations in order to mitigate wind load. Depending on the wind conditions expected during storage, transport, or installation, a lift-modification device may be actuated at the outset and may remain in its actuated position for the duration of that stage. Equally, a lift-modification device may be actuated for the duration of a storage, transport, or installation stage regardless of the wind conditions. The inventive method overcomes the problems described above by deploying active aerodynamic devices that reduce lift and/or drag forces acting on the rotor blade during storage and/or transport and/or installation.

In the following, any or all of the following assumptions may apply to a rotor blade: it may have a length in the order of 70 m or more; it can have an essentially cylindrical root section with a diameter in the order of several meters; it can be made from a composite material; it can have an essentially hollow interior.

The terms "lift-modification device" and "spoiler" are regarded as synonyms and may be used interchangeably in the following.

A lift-modification device of the inventive load mitigation arrangement is not needed once the rotor blade has been mounted to the hub of a wind turbine. Such a spoiler is not intended for use during normal operation of the wind turbine and may even have an unfavourable effect on the aerodynamic performance of the rotor blade during normal operation. Therefore, in a particular embodiment of the invention, a spoiler is detachably mounted on the rotor blade and can be removed once the rotor blade has been attached to the hub.

Such a spoiler can be arranged on the rotor blade after manufacture of the rotor blade has been completed, so that the load mitigation arrangement can be deployed during all subsequent storage, transport and handling stages. For example, a spoiler may comprise a moveable part which can be "opened" and "closed", and a base that can be attached to the rotor blade. In a particularly straightforward solution, the base can be attached to the rotor blade by means of straps that extend about the rotor blade. The spoiler base could be attached to the rotor blade surface by means of suction cups, using adhesive, fasteners, or any appropriate combination of the above. Alternatively or in addition, a spoiler can be attached to the rotor blade surface using adhesive tapes which can later be pulled off with relative ease after completion of a handling, transport, or installation operation. Alternatively, the spoiler can be an integral part of the blade, such that after installation it can be connected to a control system in the turbine and be used for load control during operation.

A spoiler is positioned to maximize its effectiveness. As explained above, when a rotor blade is held in a "horizontal chord" attitude during a hoisting maneuver, wind load fluctuation can be unfavorably high. This can be counter-acted by placing the spoiler(s) of the inventive load mitigation arrangement near the leading edge of the rotor blade on the suction side, for example close to the position of maximum thickness of the airfoil. At this position, the spoiler—when deployed—can effectively break up the incoming airflow, thereby reducing the lift force. The spoiler initiates separation of the incoming airflow and thereby reduces the maximum lift that can be generated by the airfoil in that region. One or more spoilers are arranged to extend along a region of largest chord length in order to reduce lift load fluctuation in that region. In a further embodiment of the invention, one or more spoilers are arranged in regions that are prone to vibrations, for example near the rotor blade tip. Various combinations of differently-placed spoilers are possible. In addition to the possibilities mentioned above, a spoiler may be placed near the position of half-chord, for example.

A spoiler can be realized in any suitable manner, for example as a pneumatic device, a hydraulic device, a piezo-electric device, a mechanical device, etc.

In an embodiment of the invention, the load-mitigation arrangement comprises a power supply that is configured to provide power to an actuator of a spoiler. For example, a pneumatic spoiler may be actuated by inflating a chamber using pressurized gas, and the power supply can be used to operate a compressor of the pneumatic device, to operate a release valve, etc. This power supply can be located inside the rotor blade (for example in the root region) during storage and transport. In a further embodiment, the actuatable spoilers can be powered during an installation procedure by a power supply that is an integral part of the lifting equipment.

The inventive load-mitigation arrangement reduces the maximum lift force generated by the rotor blade and also the level of variation in lift force, and therefore reduces the maximum loads exerted on any lifting, handling, and transportation equipment. These advantageously lower parameters can be exploited in a number of ways, for example by reducing expenditure on equipment, by permitting installation to be performed during higher wind speed conditions, etc.

The airfoil shape of a wind turbine rotor blade is designed to develop favorable lift and drag behavior during normal operation of the wind turbine. In an embodiment of the invention, one or more lift-modification devices are arranged on the suction side of the rotor blade. In this location, the flow can be easily brought into a situation where it separates from the surface of the airfoil due to the aerodynamic pressure gradients that exist in this area. One or more spoilers are deployed to cover at least one third of the rotor blade length.

Depending on the rotor blade design, it can be advantageous to also deploy one or more lift-modification devices on the pressure side of the rotor blade. A combination of spoilers on the suction side and pressure side in a region of the rotor blade can help achieve a lift curve which is substantially flat, similar to the lift curve of an aerodynamically inefficient cylinder. The low lift of the rotor blade in that region results in favorably stable loading levels that are independent of the wind direction.

In an embodiment of the invention, a number of lift-modification devices is arranged in the lengthwise direction from the root to the tip of the rotor blade, for example to extend into or along a region from between 25% and 75% of the rotor blade length. In a further embodiment of the invention, a number of lift-modification devices is arranged to extend into or along a region from between 30% and 60% of the rotor blade length.

The spoilers are actuated in response to any wind condition that would result in an unfavorably high wind loading of the rotor blade. Therefore, in an embodiment of the invention, the monitoring means or monitor is configured to measure a wind speed value, and is also configured to determine the wind direction. As soon as the wind speed exceeds a predefined threshold and/or as soon as the wind direction approaches a perpendicular to the leading edge, the spoiler(s) can be actuated to counteract the resulting increase in wind load. Alternatively, as mentioned above, the spoilers can remain in their actuated state, independent of wind speed, thereby ensuring a low load level in all wind conditions.

A monitoring means or monitor can comprise a rudimentary weather station that measure wind speed, wind direction, etc. The monitoring means can be arranged on a lifting bracket of a hoisting assembly in order to monitor wind conditions during installation of the rotor blade. Equally, a monitoring means can be arranged on a transportation means or transporter such as a train, a truck, a ship etc., in order to monitor wind conditions during transport of the rotor blade. Equally, a monitoring means can be arranged at a storage facility such as a quay-side holding facility in order to monitor wind conditions during storage of the rotor blades.

In a further embodiment of the invention, a monitoring means can be realized to measure or detect oscillation or vibration of the rotor blade. To this end, the monitoring means may comprise a suitable motion sensor arrangement, for example an accelerometer, as will be known to the skilled person.

A monitoring means may be realized as a single device that can measure several different parameters, or may be realized as a collection of devices that each measure a separate parameter and report to a central evaluation unit.

The lift and drag forces that can develop over a rotor blade airfoil depend on the rotor blade geometry. In an embodiment of the invention, the method can comprise a step of determining a wind load threshold for a particular type of rotor blade, and the spoiler(s) can be actuated so that the forces acting on the rotor blade will not exceed that threshold.

As indicated above, the purpose of the load-mitigation arrangement is to minimise forces resulting from airflow over the rotor blade as long as that rotor blade is not yet mounted to the hub of a wind turbine. As soon as the rotor blade is connected to the hub, the load-mitigation arrangement is no longer needed. Therefore, in an embodiment of the invention, the components of the load-mitigation arrangement are removed once the rotor blade is installed.

BRIEF DESCRIPTION

Some of the embodiments will be described in detail, with reference to the following figures, wherein like designations denote like members, wherein.

DETAILED DESCRIPTION

Figure 1:
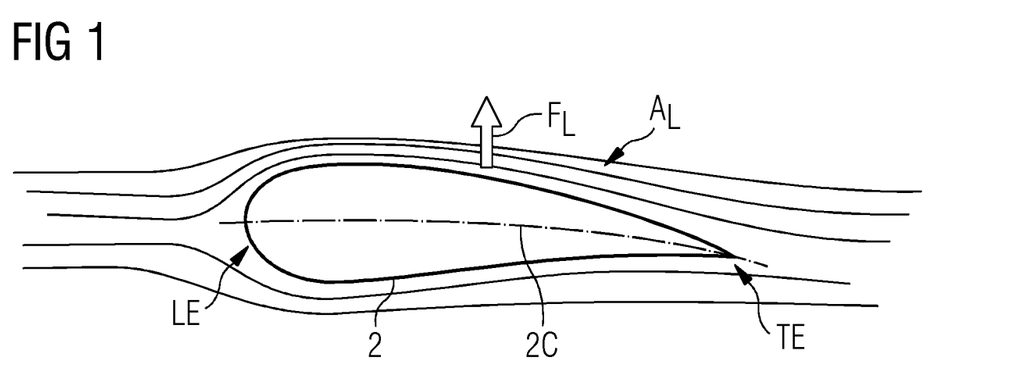
FIG. 1 shows an exemplary airfoil cross-section.

FIG. 1 shows an exemplary cross-section of a rotor blade 2, typical for the airfoil region of most wind turbine rotor blade types. The diagram shows the chord line 2C of the airfoil extending between the leading edge LE and the trailing edge TE. An incoming airflow travels over the rotor blade 2. With a favorable airfoil shape and incoming flow predominantly aligned with the chord line, the airflow around the airfoil remains predominantly attached to the airfoil, resulting in an upward lift force $F_L$ as indicated by the arrow. The magnitude of the lift force on the rotor blade is proportional to the square of the wind speed of the incoming airflow and depends furthermore on the aerodynamic coefficients for lift and drag, the local airfoil chord length and the angle-of-attack at any position along the length of the rotor blade. A rotor blade airfoil shaped to generate a large lift force $F_L$ is desirable for efficient operation of a wind turbine, but the large forces acting on the same non-mounted rotor blade during transport, installation, etc., are problematic.

Figure 2:
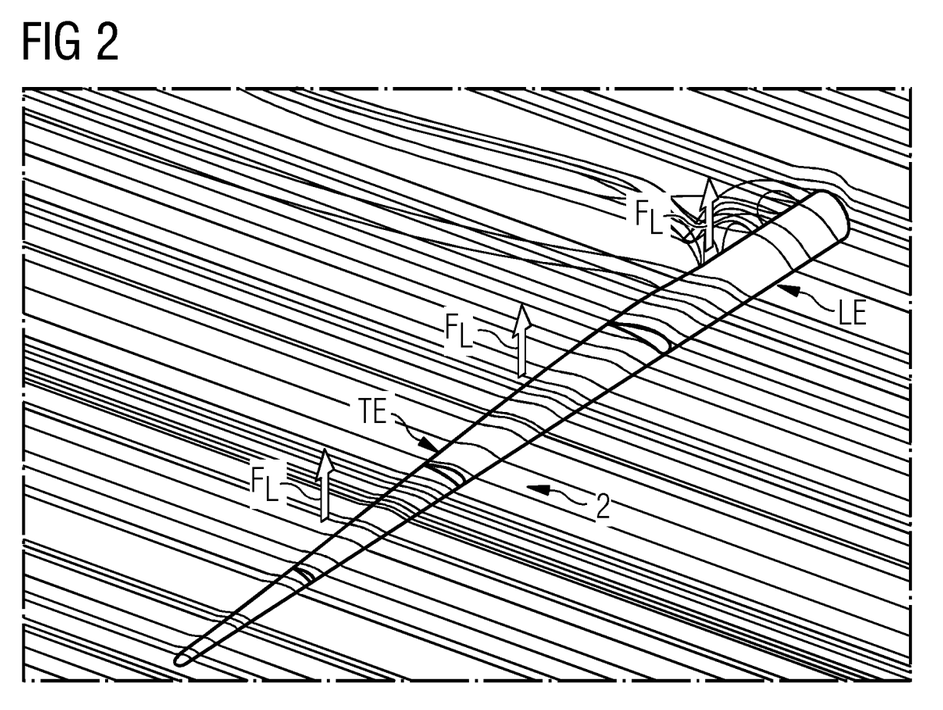
FIG. 2 illustrates airflow over a rotor blade with horizontal chord plane.

FIG. 2 illustrates the airflow over a rotor blade 2 with its chord plane in an essentially horizontal orientation, as indicated by several profile contour lines.

The diagram illustrates the varying lift force magnitudes over the length of the rotor blade 2, indicated by the differently sized arrows. The rotor blade airfoil—over much or all of its length—exhibits a wind incidence angle that lies within a region of high lift variation. As a result, the fluctuation in lift force over the non-mounted rotor blade is generally greatest over the region with the largest chord, because the sectional lift force scales proportionally with chord length. This is in contrast to lift force fluctuations over a mounted rotor blade, which are generally greatest in the outboard region towards the tip.

Figure 3:
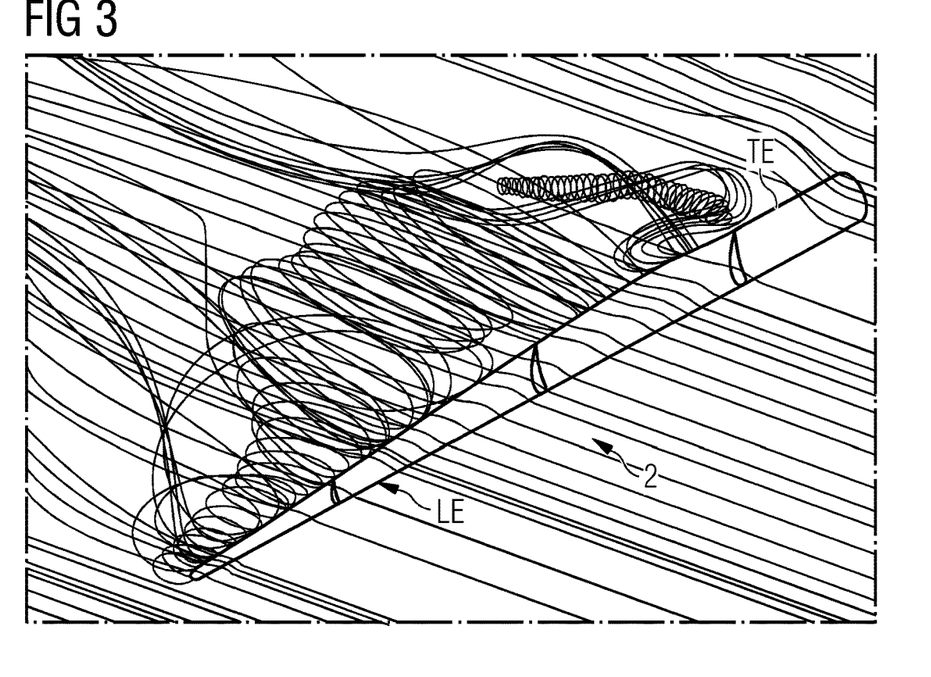
FIG. 3 illustrates airflow over a rotor blade with vertical chord plane.

Even though this "horizontal chord" orientation can be problematic during storage, transport and installation, it may be desired over a "vertical chord plane" orientation in the case of very long rotor blades, since the "vertical chord plane" orientation is associated with larger forces as illustrated in FIG. 3. Here, the entire lateral area of the rotor blade is in almost full projection to the incoming airflow. This orientation leads to very high drag forces on the rotor blade, and these forces must be withstood by the handling, transport, or storage equipment.

Figure 4:
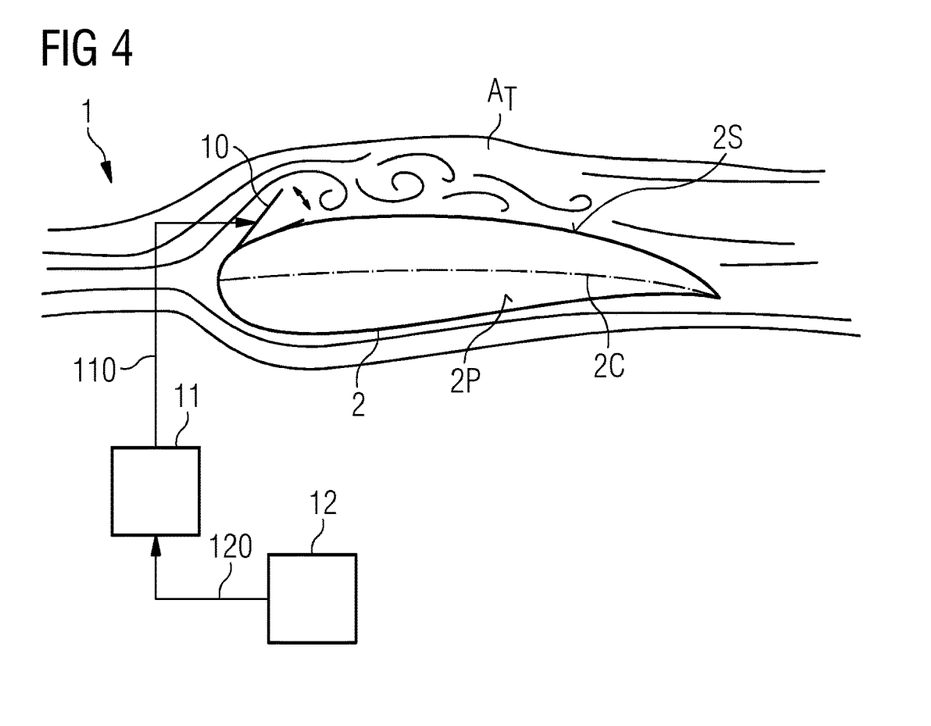
FIG. 4 shows an exemplary embodiment of the inventive load mitigation arrangement.

When storing, transporting and installing a wind turbine rotor blade, the orientation as shown in FIG. 2 may be desired. To mitigate the otherwise desirable large lift forces $F_L$, embodiments of the invention propose the use of an active spoiler as illustrated in FIG. 4. The diagram shows the airfoil of a rotor blade 2 and an embodiment of the inventive load-mitigation arrangement 1. A detachable spoiler 10 is mounted near the leading edge LE and connected to a control apparatus 11, which can actuate the spoiler 10 in response to data 120 reported by a monitoring means 12. The controller 11 can be connected via any suitable interface to the spoiler 10, for example by a pressurized air hose 110 if the spoiler 10 is a pneumatic device; by an electrical lead 110 if the spoiler 10 is actuated by a stepper motor, etc.

The monitoring means 12 may record wind speed, wind direction, etc. and report these values directly to the control apparatus 11. Alternatively, the monitoring means 12 may convert wind data into actuation levels from "mild" to "severe", and the control apparatus 11 can respond accordingly. By raising the moveable spoiler 10, the airflow over the suction side 2S of the airfoil is disturbed, breaking up its otherwise attached nature. The result is to greatly decrease or even eliminate the magnitude of the lift force.

Figure 5:
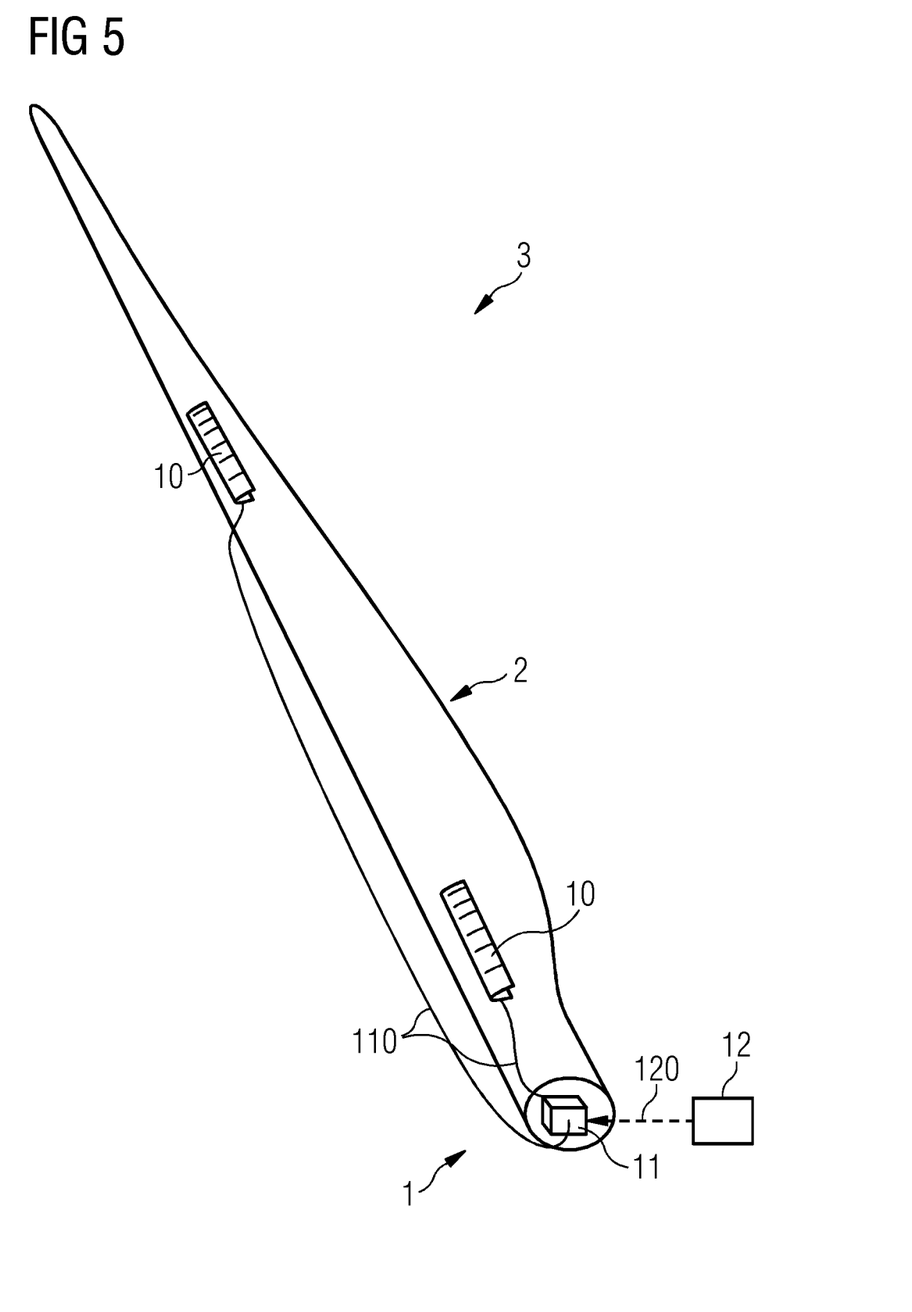
FIG. 5 shows an exemplary embodiment of the inventive rotor blade assembly.

FIG. 5 shows an exemplary embodiment of the inventive rotor blade assembly 3. After completion of the manufacturing stage, a wind turbine rotor blade 2 is equipped with a temporary load-mitigation arrangement 1, comprising various spoilers 10 mounted on the rotor blade airfoil region, and a control arrangement 11 connected to the spoilers 10 so that these be actuated as required. The control arrangement 11 is configured to wirelessly receive input data 120 from a monitoring means 12, which can be local or at a remote location (e.g. a weather station on board an installation vessel), and to actuate the spoilers 10 on the basis of the input data 120. The control arrangement 11 can be provided to control spoilers 10 of a single rotor blade, or can be configured to control spoilers of multiple rotor blades that are stacked in similar orientations, for example a stack of rotor blades during open-air transport to an installation site. Of course, as mentioned above, a spoiler can be maintained in its deployed position for the duration of a handling, storage or installation stage. The components of the load-mitigation arrangement 1 can be completely removed once the rotor blade 2 is mounted to the hub of a wind turbine.

Figure 6:
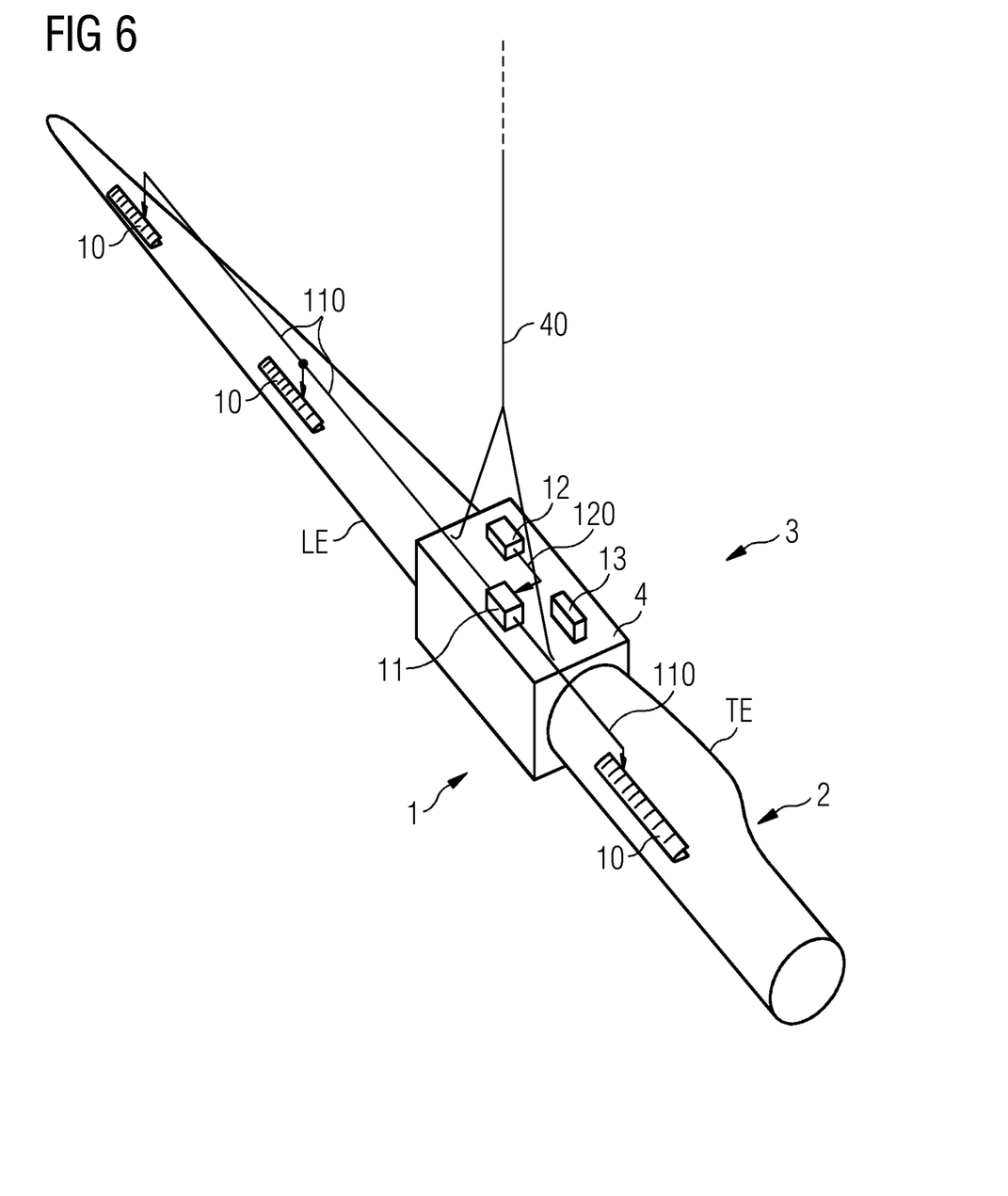
FIG. 6 shows an exemplary embodiment of the inventive rotor blade assembly during a lifting maneuver.

FIG. 6 shows another implementation of the inventive load-mitigation arrangement 1 in a rotor blade assembly 3. The diagram illustrates a stage during the installation procedure. A blade yoke 4 clamps a rotor blade 2 close to its center of gravity. The blade yoke 4 is suspended by cable 40 from a crane (not shown), which is operated to raise the rotor blade 2 to the level of the wind turbine hub (not shown). Here, the control arrangement 11 receives relevant data 120 from a weather station 12 mounted on the lifting yoke 4, and responds for example to any fluctuation in wind speed and/or wind direction by adjusting the spoilers 10 as appropriate. Because the controller 11 can adjust the spoilers 10 essentially immediately in response to changes in wind parameters to decrease the lift forces on the rotor blade 2, the lifting maneuver can be performed even during conditions that would otherwise be considered unfavorable or even dangerous.

Figure 7:
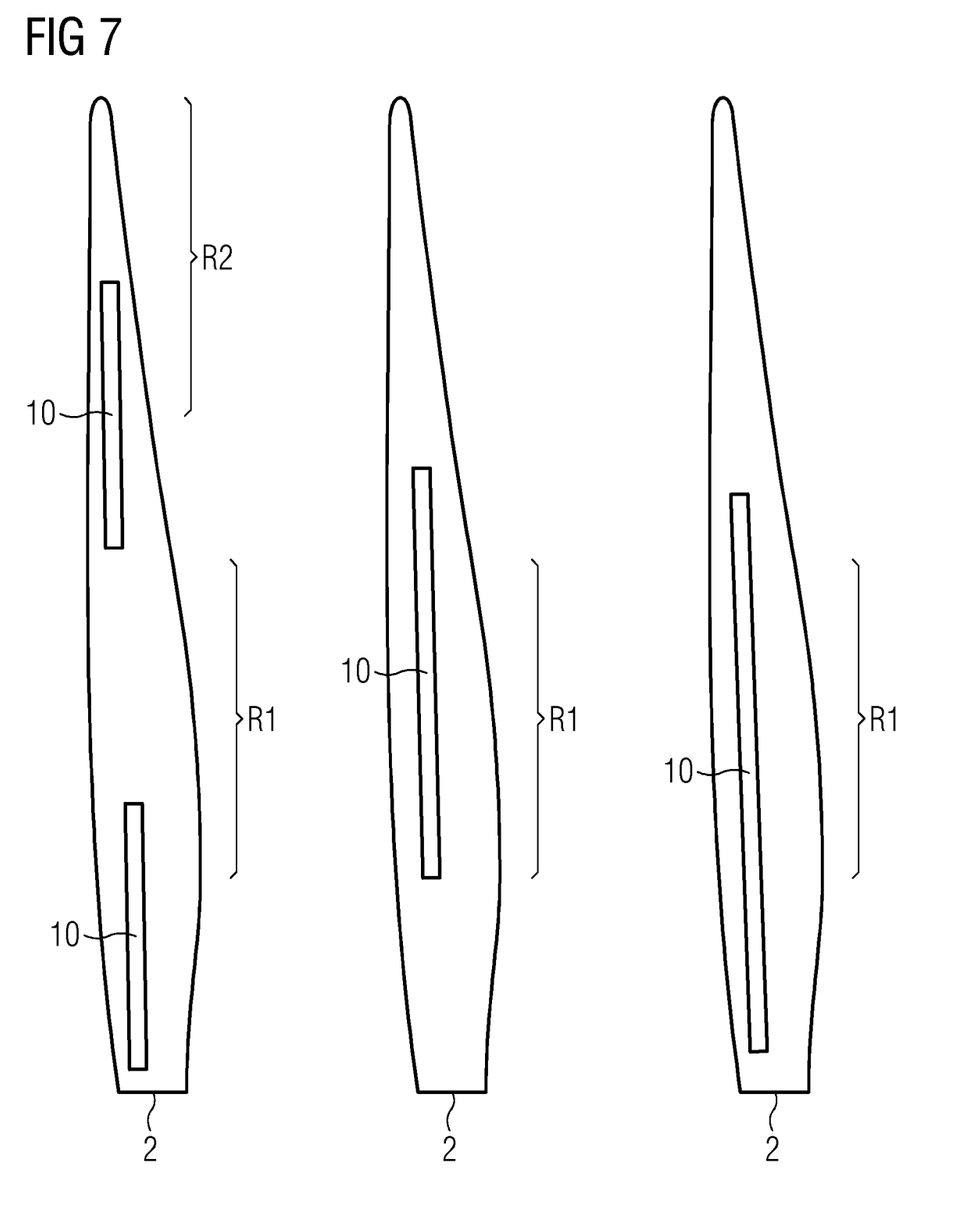
FIG. 7 shows various possible spoiler arrangements for an embodiment of the inventive load mitigation arrangement.

FIG. 7 shows various possible spoiler arrangements for an embodiment of the inventive load mitigation arrangement. On the left, two spoilers 10 are used, with one spoiler 10 further inboard and one spoiler 10 further outboard. The inboard spoiler 10 extends partially into a region R1 with long chord length, i.e., into the inboard end of the rotor blade airfoil. The outboard spoiler 10 commences further along the airfoil region and extends towards the region R2 with short chord length. The inboard spoiler 10 can act to reduce lift load fluctuation, while the outboard spoiler 10 can act to increase the blade stability thereby reducing induced oscillation of the thin and flexible blade tip.

The next embodiment shows a single spoiler 10 that extends over much of the region R1 with long chord length. This spoiler 10 can act primarily to reduce lift load fluctuation and can also assist in reducing oscillation of the outboard blade region.

The embodiment on the right also shows a single spoiler 10, which in this case extends over much of the region R1 with long chord length and also over the root region. This arrangement can serve to reduce lift load fluctuation.

Figure 8:
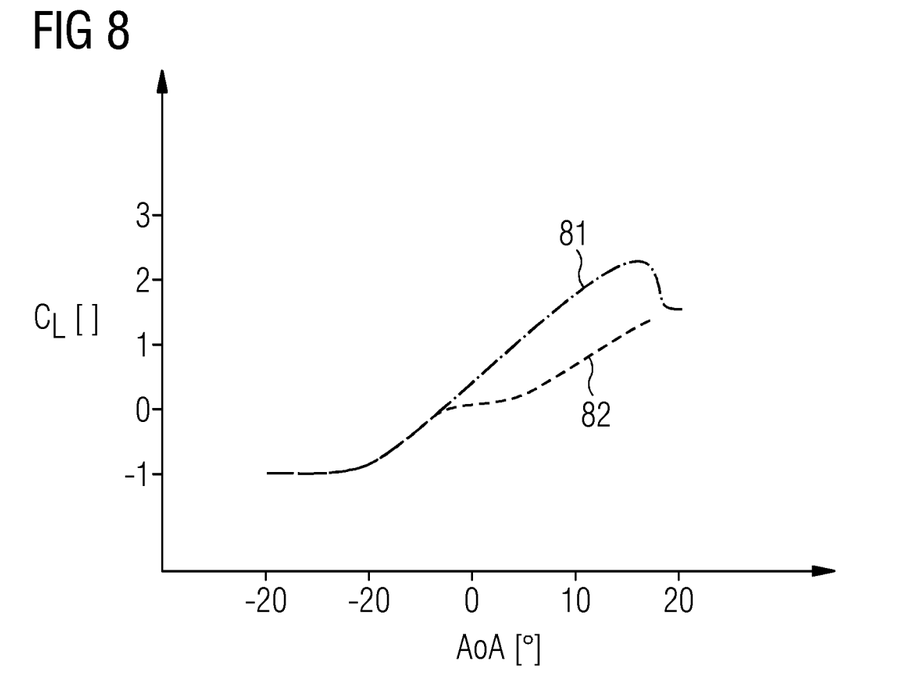
FIG. 8 shows curves of lift coefficient against angle of attack.

FIG. 8 illustrates the effect of the inventive load mitigation arrangement. The diagram shows curves 81, 82 of lift-coefficient (Y-axis, dimensionless number) against angle of attack AoA (in degrees). The angle of attack will depend on the position along the rotor blade as well as the airflow direction. The curve 81 corresponds to a rotor blade without any embodiment of the inventive load mitigation arrangement. The lift coefficient increases steadily as the angle of attack increases from −10° towards 20°. While this is generally an advantageous property for a rotor blade during normal operation of a wind turbine, it can lead to problems during storage, transport and installation, since the high lift forces acting on the non-mounted rotor blade require robust and expensive handling equipment. The curve 82 corresponds to an equivalent rotor blade that is equipped with an embodiment of the inventive load mitigation arrangement. With the actuated spoiler(s), the lift coefficient increases less steeply as the angle of attack increases from 0° towards 20°. The lower lift coefficient can reduce the loads on rotor blade handling equipment during storage, transport and installation, and can therefore significantly reduce costs as well as extending the "window of opportunity" for rotor blade installation.

Although the present invention has been disclosed in the form of preferred embodiments and variations thereon, it will be understood that numerous additional modifications and variations could be made thereto without departing from the scope of the invention. For example, a spoiler can be an integral part of the blade, and after installation the spoiler can be connected to a control system of the wind turbine so that it can be used for load control during operation.

For the sake of clarity, it is to be understood that the use of "a" or "an" throughout this application does not exclude a plurality, and "comprising" does not exclude other steps or elements.

The invention claimed is:

1. A method of performing load mitigation on a non-mounted rotor blade of a rotor blade assembly, wherein the method comprises the steps of:
arranging an actuatable lift-modification device of a load mitigation arrangement on a surface of the non-mounted rotor blade;
monitoring loads acting on the non-mounted rotor blade;
actuating the actuatable lift-modification device based on the monitored loads, and
removing the actuatable lift-modification device after the non-mounted rotor blade has been mounted to a hub of a wind turbine.

2. The method according to claim 1, comprising a step of determining a wind load threshold for the non-mounted rotor blade, and wherein the load mitigation is performed such that wind load on the non-mounted rotor blade does not exceed the wind load threshold.

3. The method according to claim 1, wherein the load mitigation arrangement includes the actuatable lift-modification device, a monitor configured to estimate magnitudes of the loads acting on the non-mounted rotor blade, and a controller configured to actuate the actuatable lift-modification device based on the estimated magnitudes to mitigate the loads acting on the non-mounted rotor blade.

4. The method according to claim 3, wherein the load mitigation arrangement includes a power supply configured to provide power to actuate the actuatable lift-modification device.

5. The method according to claim 3, wherein the monitor is configured to measure a wind speed value and/or to determine a wind direction and/or to measure acceleration of the non-mounted rotor blade.

6. The method according to claim 3, wherein the monitor is arranged on a lifting bracket to monitor wind conditions during mounting of the non-mounted rotor blade to the hub.

7. The method according to claim 1, wherein the actuatable lift-modification device is arranged in a region of a leading edge of the non-mounted rotor blade.

8. The method according to claim 1, wherein the actuatable lift-modification device is a pneumatic device.

* * * * *